(12) United States Patent
Dominowska et al.

(10) Patent No.: US 7,810,035 B2
(45) Date of Patent: Oct. 5, 2010

(54) BROWSING WEB CONTENT USING PREDICTIVE NAVIGATION LINKS

(75) Inventors: Ewa Dominowska, Kirkland, WA (US); Robert J. Ragno, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 928 days.

(21) Appl. No.: 10/965,178

(22) Filed: Oct. 15, 2004

(65) Prior Publication Data
US 2006/0085766 A1     Apr. 20, 2006

(51) Int. Cl.
*G06F 17/00*     (2006.01)
(52) U.S. Cl. ............ 715/739; 715/206; 715/786; 715/788; 715/854
(58) Field of Classification Search ........ 715/512, 715/501.1, 514, 530, 786, 788, 531, 854, 715/540, 760, 716, 853, 739
See application file for complete search history.

(56) References Cited

U.S. PATENT DOCUMENTS

| | | | | |
|---|---|---|---|---|
| 5,854,630 A * | 12/1998 | Nielsen | ............. | 715/739 |
| 5,870,559 A * | 2/1999 | Leshem et al. | ............. | 709/224 |
| 5,895,470 A * | 4/1999 | Pirolli et al. | ............. | 707/727 |
| 5,920,859 A * | 7/1999 | Li | ............. | 707/5 |
| 5,924,104 A * | 7/1999 | Earl | ............. | 715/205 |
| 5,958,008 A * | 9/1999 | Pogrebisky et al. | ............. | 709/223 |
| 5,974,572 A * | 10/1999 | Weinberg et al. | ............. | 714/47 |
| 6,035,330 A * | 3/2000 | Astiz et al. | ............. | 709/218 |
| 6,055,572 A * | 4/2000 | Saksena | ............. | 709/224 |
| 6,144,962 A * | 11/2000 | Weinberg et al. | ............. | 1/1 |
| 6,189,019 B1 | 2/2001 | Blumer et al. | | |
| 6,195,679 B1 * | 2/2001 | Bauersfeld et al. | ............. | 709/203 |
| 6,237,006 B1 * | 5/2001 | Weinberg et al. | ............. | 707/797 |
| 6,285,999 B1 * | 9/2001 | Page | ............. | 707/5 |
| 6,341,310 B1 * | 1/2002 | Leshem et al. | ............. | 709/223 |
| 6,470,383 B1 * | 10/2002 | Leshem et al. | ............. | 709/223 |
| 6,522,875 B1 * | 2/2003 | Dowling et al. | ............. | 455/414.3 |
| 6,549,944 B1 * | 4/2003 | Weinberg et al. | ............. | 709/224 |
| 6,585,776 B1 * | 7/2003 | Bates et al. | ............. | 715/206 |
| 6,597,377 B1 * | 7/2003 | MacPhail | ............. | 715/738 |
| 6,665,687 B1 * | 12/2003 | Burke | ............. | 1/1 |
| 6,684,205 B1 * | 1/2004 | Modha et al. | ............. | 707/3 |
| 6,754,873 B1 * | 6/2004 | Law et al. | ............. | 715/208 |
| 7,024,629 B2 * | 4/2006 | Alegria et al. | ............. | 715/739 |
| 7,058,628 B1 * | 6/2006 | Page | ............. | 707/5 |
| 7,120,914 B1 * | 10/2006 | Manthos et al. | ............. | 718/108 |
| 7,136,849 B2 * | 11/2006 | Patrick | ............. | 707/3 |
| 7,233,943 B2 * | 6/2007 | Modha et al. | ............. | 707/3 |
| 7,266,762 B1 * | 9/2007 | Chakrabarti et al. | ............. | 715/205 |
| 7,302,635 B2 * | 11/2007 | Bates et al. | ............. | 715/234 |
| 7,308,463 B2 | 12/2007 | Taulbee et al. | | |

(Continued)

OTHER PUBLICATIONS

Peter Aiken et al. Microsoft Computer Dictionary, Microsoft Press, Fifth Edition, p. 229.*

(Continued)

*Primary Examiner*—Sara England
*Assistant Examiner*—John Heffington

(57) ABSTRACT

A predictive travel log system using one or more ranking schemes to predict the location that a user would seek to navigate to through back and forward navigation in a web browser is provided. The navigation functionality can be exposed through traditional back and forward buttons with drop down travel log menus found in a browser user interface.

24 Claims, 10 Drawing Sheets

U.S. PATENT DOCUMENTS

| | | | |
|---|---|---|---|
| 7,346,610 B2* | 3/2008 | Ruthfield et al. | 707/3 |
| 7,389,287 B1* | 6/2008 | Burke | 1/1 |
| 7,644,134 B2* | 1/2010 | Cohen et al. | 709/218 |
| 2002/0046281 A1* | 4/2002 | Cope | 709/227 |
| 2002/0147805 A1* | 10/2002 | Leshem et al. | 709/223 |
| 2003/0043193 A1* | 3/2003 | Alegria et al. | 345/764 |
| 2003/0061214 A1* | 3/2003 | Alpha | 707/7 |
| 2003/0115333 A1* | 6/2003 | Cohen et al. | 709/227 |
| 2003/0128231 A1* | 7/2003 | Kasriel et al. | 345/736 |
| 2003/0196172 A1* | 10/2003 | Bates et al. | 715/513 |
| 2003/0216919 A1* | 11/2003 | Roushar | 704/260 |
| 2003/0231216 A1* | 12/2003 | McBrearty et al. | 345/855 |
| 2004/0064335 A1* | 4/2004 | Yang | 705/1 |
| 2004/0243628 A1* | 12/2004 | Patrick | 707/104.1 |
| 2005/0076097 A1* | 4/2005 | Sullivan et al. | 709/218 |

OTHER PUBLICATIONS

Gerard Salton, Chris Buckley, On the Use of Spreading Activation Methods in Automatic Information Retrieval, ACM.*

* cited by examiner

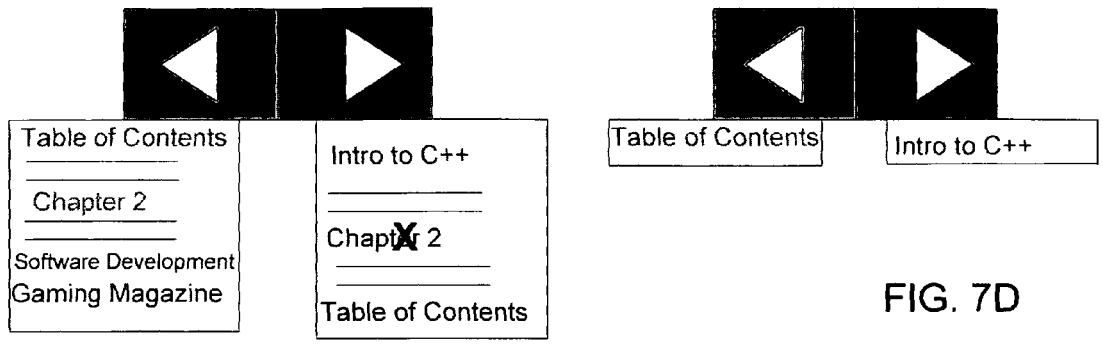
FIG. 6D
FIG. 7D
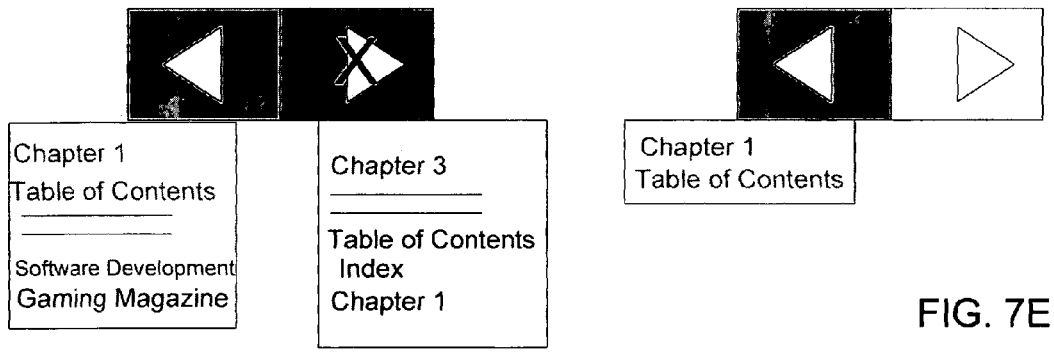
FIG. 6E
FIG. 7E
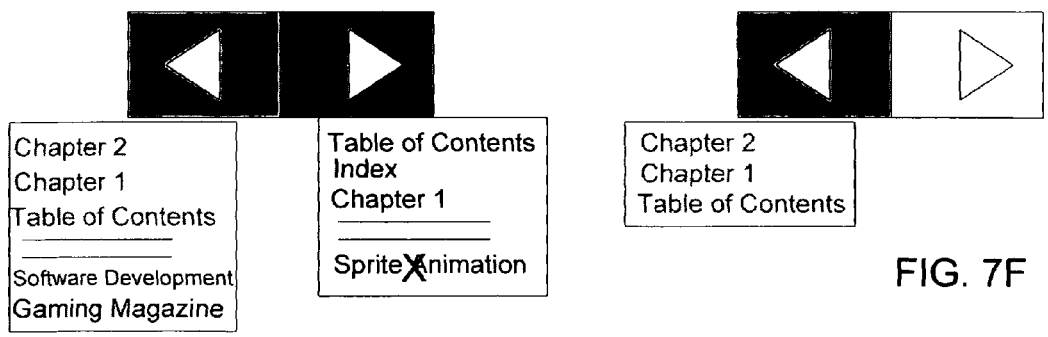
FIG. 6F
FIG. 7F

FIG. 8

BROWSING WEB CONTENT USING PREDICTIVE NAVIGATION LINKS

FIELD OF THE INVENTION

Aspects of the present invention are directed generally to providing navigation links to a user browsing content, and more particularly to providing a user biased ranking of navigation links for the content to which the user would likely want to browse to next on the World Wide Web from a currently viewed web page.

BACKGROUND OF THE INVENTION

Finding the most relevant web content can be can be time consuming and arduous for users. The most common way to navigate through web content is by selecting hyperlinks on a currently-viewed web page. Also, most, if not all, web browsers provide back and forward button functionality accessible from the browser user interface. For example, Internet Explorer version 6.0 by Microsoft Corporation of Redmond, Wash. provides forward and back functionality using clickable buttons. Examples associated with Internet Explorer version 6.0 are described below.

A user browsing from web page 1 to web page 2 to web page 3 by sequential selection of hyperlinks can navigate back from web page 3 to web page 2 by pressing the back button. After navigating back to web page 2, a user can navigate back further to web page 1 by pressing the back button or, alternatively, navigate forward by pressing the forward button to navigate to web page 3. From web page 3 however, pressing the forward button will result in no action taken. Namely, the forward button merely allows forward navigation to a web page from which the currently viewed web page has most recently navigated to during the current browsing session. Similarly, pressing the back button allows navigation back to the web page from which the user most recently navigated to the currently viewed page.

The functionality of the back and forward buttons has been expanded with the use of a down arrow next to each button, which when selected causes a drop down menu to be displayed. The drop down menu or travel log menu associated with the back button provides a travel log in the form of a history of the recent pages which the user has navigated to with the items ordered from top to bottom on the menu with most recently viewed web page listed first, the second most recently viewed web page listed second and so on. Typically, the list provides the URL (uniform resource locator) of each web page. The forward button drop down menu or travel log menu is similar to the back button travel log menu in format except it provides a travel log of web pages that can be navigated to in the forward direction. In this instance, the travel log menu for the forward button includes pages which can be navigated to in the forward direction that the user has already navigated to during the current browsing session.

If a back button travel log menu lists five items and the user selects item 3, the browser navigates to item 3. The travel log menu for the forward button would include items 1 and 2 from the previous travel log menu and the travel log menu for the back button would include items 4 and 5 from the previous travel log menu. Thus, navigation by selecting a URL from a travel log menu preserves the history regarding both the page which navigated to the currently viewed page by linking (as opposed to selection from the drop down list) and the page to which (if any) the user navigated from the currently viewed page by selection of a hyperlink.

While the aforementioned back and forward button functionality and travel log menus can make the user browser experience less time-consuming, they are only available if a user has already navigated to those pages during the current browsing session. As such, when a user initiates a browsing experience, the browser displays the user's home page. In this instance, no back or forward button functionality including back and forward travel log menus is available because the user has not navigated to any other pages during the current browsing session. At most, the user can access a favorites list which identifies web pages which a user has previously bookmarked and can directly navigate to. It would be beneficial to anticipate where the user might want to navigate to and provide the user with navigational alternatives other than the hyperlinks available on the currently viewed page.

The Opera web browser by Opera Software ASA of Oslo, Norway provides a fast forward functionality. The Opera browser automatically analyzes the text on the currently-viewed page to determine what page would come next in a logical sequence and allows the user access to that page when the fast forward button is clicked on. When visiting an image gallery with numbered images, the Opera browser allows the user to view the next image in an image sequence by pressing the fast forward button.

While the Opera fast forward functionality improves on the traditional back and forward button functionality and travel log menus, it would be useful to further enhance the user browsing experience by providing multiple navigational alternatives in addition to the hyperlinks and history-based navigation alternatives.

BRIEF SUMMARY OF THE INVENTION

Aspects of the present invention increase the navigational alternatives for browsing available to a user by including predictive navigational alternatives.

In certain aspects, the present invention exploits user navigation patterns to generate a predictive travel log that can provide an enhanced browsing experience. In some aspects, the present invention employs a predictive travel log system using one or more ranking schemes to predict the location that a user would seek to navigate to through back and forward navigation. In one aspect, the navigation functionality can be exposed through traditional back and forward buttons with drop down travel log menus found in a browser user interface. In other aspects, a navigational control in the form of a user interface component, such as a toolbar, can provide the navigation functionality to the user.

BRIEF DESCRIPTION OF THE DRAWINGS

The foregoing summary of the invention, as well as the following detailed description of illustrative embodiments, is better understood when read in conjunction with the accompanying drawings, which are included by way of example, and not by way of limitation with regard to the claimed invention.

FIG. 3 shows a navigation toolbar portion of a user interface according to an illustrative embodiment of the present invention.

FIGS. 5A-5G show a navigational example with a navigation toolbar forming part of the user interface according to an illustrative implementation of the present invention.

FIGS. 6A-6G show the same navigational example as FIGS. 5A-5G with traditional forward and back buttons forming part of the user interface according to an illustrative implementation of the present invention.

FIGS. 7A-7G depicts what the traditional back and forward button portions of the user interface would appear if a user navigated to the same sequence of pages as shown and described with respect to FIGS. 5A-5G.

FIG. 8 shows a browser user interface including the navigation toolbar according to an illustrative embodiment of the invention.

DETAILED DESCRIPTION OF THE INVENTION

General-Purpose Computing Environment

Figure 1:
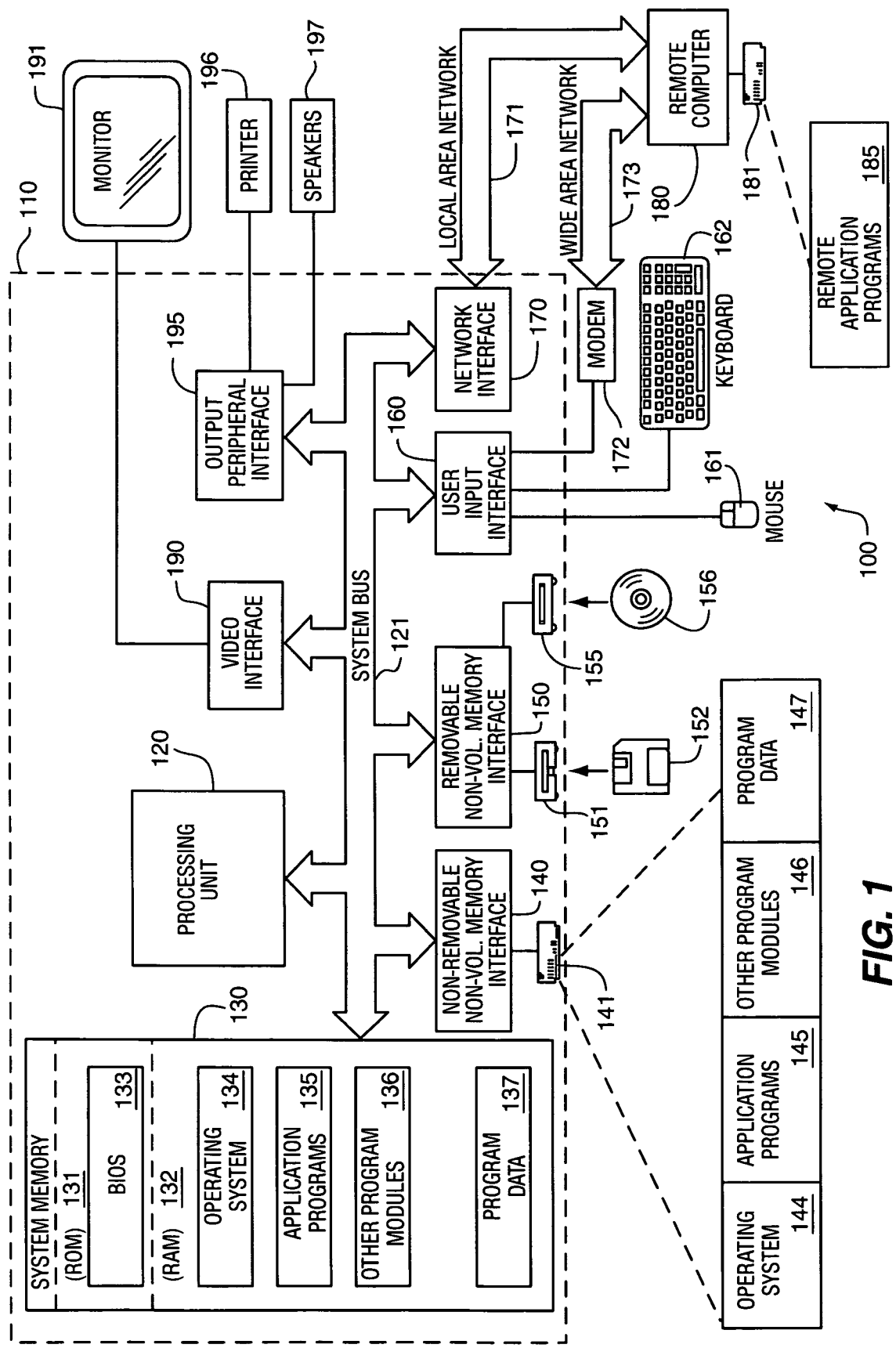
FIG. 1 illustrates an example of a computing system environment in which the present invention may be implemented.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, and removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195 to the system bus 121.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Introduction

Typically, computer users navigate web content through links, such as hyperlinks, within a currently-viewed web page or by entering a URL in the address area of a web browser. The user interface for many existing browsers provides forward and backward button functionality, which allows the user to navigate to pages previously navigated to from the currently-viewed page during the current browsing session. Back and forward drop down travel log menus may be available, which can provide the user the ability to navigate directly to pages recently visited other than the most recently viewed page in the forward or back direction. In one aspect, the present invention can improve the functionality of browser-provided navigation controls such as the travel log menu associated with the back and forward buttons.

Over 98% of public web sites can be accessed by direct links from other public web pages. Studies of user's web navigation patterns show that people generally concentrate their web browsing within small, topic-related clusters. Frequently, topic-related pages are directly connected through hyperlinks. In certain aspects, the present invention takes advantage of this behavior by predicting where a user might desire to navigate to by, among other things, considering that forward navigation might include any hyperlink on the currently viewed page.

In one aspect, a predictive travel log system according to the present invention can employ one or more schemes that rank prospective locations to which a user may desire to navigate. The ranking may be presented in the travel log menu associated with the back and forward navigation buttons. By providing prospective navigation locations in a travel log menu the need for a user to find and evaluate the hyperlinks on a page or conduct a search to identify a desired page to navigate to can be reduced. In certain aspects of the invention, a search can be automatically performed by the system in the background based on the page that is currently being displayed in the browser user interface. The search results can be evaluated by the system and the forward and background travel log menus can be populated with items representing links found in the search. The system then permits the user to navigate to a page found during the automatic search by selecting the link from the travel log menu without having to independently perform a search.

In certain aspects, the system of the present inventions provides enhanced functionality to traditional navigation history based browser travel logs. In some aspects, the functionality can be directly exposed through the use of back and forward buttons with drop down travel log menus. Alternatively, a navigational control in the form of a modified user interface can be provided to present this functionality to the user. In this instance, a toolbar may be provided where individual menus for specific ranking categories may be displayed automatically or in response to a user input.

For purposes of this description the term "in-link" means a hyperlink on some page which links to the current page and the term "out-link" means a hyperlink on the current page which points to some other page. These terms will also be used to refer to the pages themselves—an "in-link" may refer to a page with a hyperlink to the current page, and an "out-link" may refer to a page that can be navigated to by way of the hyperlinks on the current page. In some aspects of the present invention the in-links and out-links of a web page can be accessed from the back and forward button travel log menus.

Many web sites have a poor or awkward organizational structure. When browsing through partitioned pages, making the in-links and out-links accessible through the back and forward travel log menus provides the user with both previous page and next page functionality, even if one or both of the previous page or next page has not been previously navigated to during the current browsing session. This can be particularly helpful in that finding navigations links within a page often can be difficult, especially in view of the proliferation of multimedia, page banners and advertisements. Consequently, providing these links to a user by way of a browser-based, persistent control such as the forward and back buttons can allow for simpler navigation.

Individuals who feel more comfortable using the keyboard or who have difficulty using a pointing device due to a disability or otherwise will benefit from the dropdown travel log menu providing additional web page navigation options such as in-links. These users can employ keyboard functionality (e.g., Alt-key+another key) to navigate to links embedded within the page content. This is advantageous as many web pages currently do not support keyboard accessibility.

Description

System Overview

According to the invention, once the user begins a browsing session by launching their browser causing navigation to their home page, the system populates the back and forward button travel log menus with items representing links believed to be of most interest to the user. This scheme repeats every time a user navigates to another page in that the system again populates the back and forward button travel log menus with the links believed to be of most interest to the user. The system can populate the browser's back travel log menu with items representing links from ranked categories such as pages to which the user most recently browsed, if any, and the most relevant pages linking to the current page, namely in-links. The scheme for ranking the in-links and deciding which to identify in the travel log menu will be discussed later. While the number of links displayed in the travel log menu at one time would typically be between 1 and 20, more links can be displayed in the travel log menu. Ultimately, the maximum number of links displayed at one time is a function of the size of the user interface.

Also, the system can populate the forward travel log menu with an item representing the page which the user most recently backed out of and the most relevant out-links, that is pages linked to from the currently viewed web page. Hence, the forward and back button functionality can be configured to display one or more ranking categories. As described in the above example, two ranking categories can be displayed in the travel log menu for the back button: time relevant pages and in-links. Thus, when the inventive scheme is implemented in the above manner, the existing on-click behaviors of the back\forward buttons can be preserved in cases where a travel log menu for each button was conventionally available.

In contrast to the conventional drop down travel log menu, the present invention provides a greater breadth of navigation alternatives to the user from the currently viewed web page. Similar to the conventional system, each alternative identified in the drop down travel log menu is a viable navigation alternative. To preserve the functionality of the conventional travel log menus, the navigational history depth may be one of the available ranking categories, based on recently viewed pages. These travel log menu options form part of the actual or real navigation history while other travel log menu navigation alternatives form part of a predictive framework in that they are based on a determination of pages to which the user would likely want to visit. In some aspects of the invention, the actual navigation history alternatives may be distinguished from the predictive navigational alternatives by, for example, displaying them in a different manner.

Ranking

One or more ranking categories may be employed in a forward or back travel log menu. To avoid user confusion and requiring users to learn anew the behavior of the forward or back buttons and the associated travel logs, it is preferable, though not required, to maintain browser navigation history as one of the ranking categories. With browser navigation history, the pages can be listed in rank order, e.g., top to bottom, beginning with the most recently viewed web page.

The techniques employed for ranking categories in the back button travel log menu and the forward button travel log menu differ in some respects and will be discussed separately. Many ranking schemes can be utilized to provide a predictive list of navigation alternatives and it should be understood that schemes discussed herein are merely exemplary. Also, some of the schemes may be combined into a single ranking scheme as appropriate.

According to aspects of the invention, one scheme for back page ranking applies a ranking category in which a search engine performs a search and the default search engine ranking mechanism ranks the search results by relevancy. In this scenario, the browser causes a search engine to run a search in the background (e.g., transparent to the user). The search engine searches for relevant pages based on a ranking category according to the content of the currently viewed page (e.g., title, major content of the page, content proximate to the current cursor location). Such searches may be limited by preprogramming the search engine to search only select locations such as a single web site. The ranking can also be based on information local to the browser, such as how recently the page has been visited or how often the page has been visited. The ranking can also be affected by information retrieved from the pages to be ranked themselves, such as the positioning of the hyperlinks or the textual content surrounding the hyperlinks. It will be appreciated that there are many ways in which results can be ranked and that those identified herein are illustrative and by no means exhaustive.

In some implementations, the browser might not have the capability to fetch and interpret the content from certain search engines. In these cases, the search engine interaction can be abstracted by a library that the browser communicates with. In an illustrative implementation of the invention, a library, such as a library found on any type of Win platform (e.g., .NET library, library on Win32 platform or COM platform) can use, among other information sources, the Google search engine, the MSN search engine or Encarta to fetch results. Any search engine can be used as an information source as long as it can release content from either the location of any URL or the content of the pages including the prominent words or title. Under such a design, the search engine can be changed on the fly, and multiple search engines can be used to retrieve a total result set.

According to another back page ranking scheme, in-links from the same web site as the currently viewed page can be ranked ahead of in-links from other web sites with higher level same site in-links being ranked ahead of or higher than lower level same site in-links. The motivation for such a ranking scheme is based on the premise that same site in-links are more valuable than in-links from other web sites. Higher level same site links may be deemed more relevant than lower level same site in-links to be consistent with traditional back button functionality. To determine whether an in-link is from the same web site as the currently viewed page, the URL or site address can be compared with the URL or site address of the currently viewed page. For example, the address of in-link results can be parsed (e.g., www.name.com/patent/application) and the prefix of the in-link result (www.name.com) can be compared to the address of the web site associated with the currently viewed page (e.g., www.name.com/patent/application/description), namely the prefix (www.name.com) of the currently viewed web page address. To distinguish between the levels of in-links from the same site as the currently viewed web page, fuzzy prefix logic may be employed. In addition, a snippet of content from each in-link identified in the travel log menu may be displayed to aid the user in further assessing the relevancy of the in-link. The snippet of content may be the anchor text that refers to the currently viewed web page and may be displayed in a number of different manners such as 1) in the travel log itself, 2) when the user moves the cursor to hover over the in-link, 3) in a drop down when the user clicks on an expansion arrow; or 4) in a pop up when the user performs the equivalent of a right click operation.

Another back page ranking scheme involves obtaining generalized higher-level pages through fuzzy prefix logic on the address of the currently viewed web page. Different from the scheme described above, this methodology is not limited to ranking in-links to the currently viewed page. Thus, the address of the page may be parsed in an up directory fashion to determine if a page exists. For example, if the currently viewed page is www.name.com/patent/application/description, then the method would attempt to parse this address in an upward manner to look for prior directories www.name.com/patent/application, www.name.com/patent, and www.name.com to determine if they exist and rank them accordingly. Some sites lend themselves to identifying higher level pages in this manner while others do not.

According to another back page ranking scheme, out-link text is parsed to determine if any keywords are present in the text and if so, those out-links are ranked higher than out-links without keywords. In one illustrative implementation of this scheme, hyperlinks on the currently viewed page are analyzed to determine if their text contains directional words associated with back navigation such as "home" or "back". The theory for such a scheme is that a user would more likely desire to navigate to one of these out-links as opposed to others. Such out-links will identify pages within the same site as the currently viewed web page, which are generally more relevant to the user than those pages from other sites. In a natural modification of this scheme, higher level out-links can be identified and ranked. For example, out-links (e.g., hyperlinks) on the current page can be parsed using fuzzy prefix logic to determine if they are higher level out-links in much the same way that higher level in-links were identified and ranked.

One forward page ranking scheme ranks out-links according to their order of appearance within the currently viewed page. According to another forward page ranking scheme, out-links can be ranked based on whether they link to a page from the same web site as the currently viewed page or to a page from another web site. Same site out-links are navigated to more frequently from a currently viewed page than out-links from other web sites. Determining whether a link identifies a page from the same site as the currently viewed web page or another site can be determined as described with respect to the same site in-link back page ranking scheme.

In another forward page ranking scheme, out-link text keywords are parsed to determine an appropriate ranking for out-links. This scheme is similar to the back page ranking scheme involving out-link text keyword parsing. In one illustrative implementation of this scheme, hyperlinks on the currently viewed page are analyzed to determine if their text contains directional words associated with forward navigation such as "goto" or "next".

According to another forward page ranking scheme, a heuristic interpretation of the currently viewed web page can be carried out. For example, the structure of the currently viewed web page can be analyzed to detect special pages such as search results pages, index pages or site maps. In this example, the links on the special page (e.g., search results page, news page) can be parsed such that the links which correspond to the assumed structure (e.g., search results, news article) can be ranked (e.g., in the order of their relevance, order of appearance) while links that do not correspond to the assumed structure (e.g., non-search results, non-news articles) can be ignored.

Another forward page ranking scheme entails an external ranking of out-link based pages. In one implementation of this scheme, out-links can be ranked by determining the number of in-links that refer to each respective out-link page. The theory behind this scheme is that out-link pages which have a larger number of pages which link thereto have been shown to be more relevant than an out-link page having a smaller number of in-links. In another implementation of this scheme, the content can be evaluated in a traditional search engine style ranking.

Another ranking category which may be employed includes ranking based on data regarding pages navigated to by users who have navigated to the current page. This category can be limited to only in-links, only out-links, both in-links and out-links, or may be applied without regard to whether the page is an in-link or out-link. Another ranking category that may be employed is to rank pages that answer queries that return the current page. In this instance, the browser would make a function call to a search engine to perform a search to find queries which returned the current page. The search engine would identify and rank the other pages which answered those queries and return this information. For example, if the current page is a news story about Hurricane Ivan, a search of news stories related to Hurricane Ivan would turn up the current page as well as other pages related to the hurricane. Those other pages could be ranked based on the number of hits that they received. In the ranking category just discussed and some others, external sources of data such as search engines or databases would likely need to be accessed to obtain the information utilized to rank the various navigational alternatives.

Each of the various ranking schemes can be processed separately at the same time, i.e., parallel processing. Some ranking categories lend themselves to further division of calculations. For example, only one level of links may be displayed at a time, but it may be necessary to actually retrieve a second level of links for ranking purposes. It is also possible to prefetch and cache a second level of links to increase the system performance including time for displaying data on the user interface. Namely, a search can be performed in advance of navigating to a page and searches for pages which have just been navigated to may be retained in cache.

The navigational cache can be separate from the browser's cache or integrated with the browser's cache resulting in benefits in that pages in the browser's cache need not be stored in the navigational cache.

User Interface

An illustrative user interface that may be employed with the present invention would include the traditional forward and back buttons with their corresponding drop down travel log menus. The traditional back/forward button functionality associated with the browser can be integrated with an illustrative predictive travel log according to the present invention. The navigation history associated with the traditional back button and traditional forward button is one of multiple ranking schemes available.

Multiple ranking categories may be displayed concurrently. The display of the ranking results can be presented in several formats: 1) a single list separated based on the ranking categories, 2) individual lists according to ranking categories, and 3) a blended list in which ranking categories are intermixed. To determine the rankings of individual links from different categories, a weighting scheme can be employed. The weighting scheme may be a predetermined default scheme, a selected one of a series of predetermined weighting schemes, an adaptive weighting scheme which automatically adjusts based on the user's prior behavior, or any other appropriate scheme known to one skilled in the art. A user may configure the weighting scheme by using a slider user interface to assign individual weights to the various ranking categories.

Figure 2:
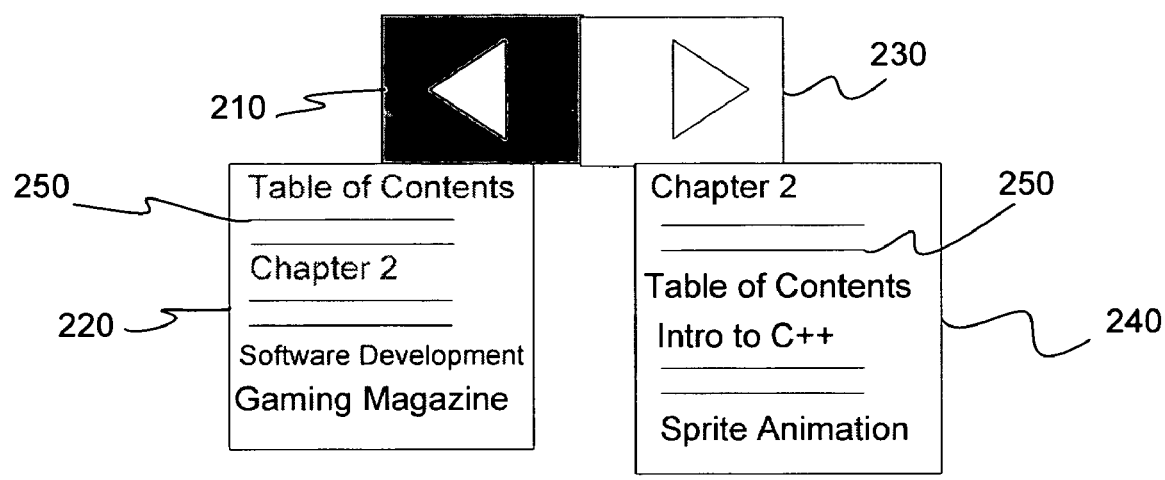
FIG. 2 depicts a portion of a user interface according to an illustrative embodiment of the present invention.

In the travel log menu, the user interface visually distinguishes items from different ranking categories. FIG. 2 shows a portion of an illustrative user interface including a back button 210 and its travel log menu 220 and a forward button 230 and its travel log menu 240. For example, when the ranking categories are in the travel log menu but not intermixed, one way to separate them is through a visual indication such as the bars 250 shown in FIG. 2. Alternatively, the items may be color-coded or uniquely highlighted based on the ranking category to which they belong. This is particularly helpful when a blended list of ranked items is provided where the items are intermixed. As shown in FIG. 2, there are three separate ranking categories shown for both the forward and back buttons. The number of items displayed in the travel log menu generally will range between 1 and 20 due to the limits of display real estate, but may be increased. More items than displayed on the travel log menu may be made accessible to the user for example in response to a user selection of a more button or expansion arrow. Also, the travel log menu can be configured to slowly scroll automatically or responsive to a user input to provide the user with more navigational alternatives to select from then displayed at any one time.

The behavior of the back and forward button can be configured by a user. For example, pressing the forward button could 1) directly navigate to the top most entry in travel log; 2) drop down the travel log menu; or 3) directly navigate if a navigation-based entry exists and drop down the travel log menu if the menu contains all predictive items. One skilled in the art will appreciate that a multitude of behaviors could be configured and those just identified are merely illustrative.

Figures 3, 5A, 5B:
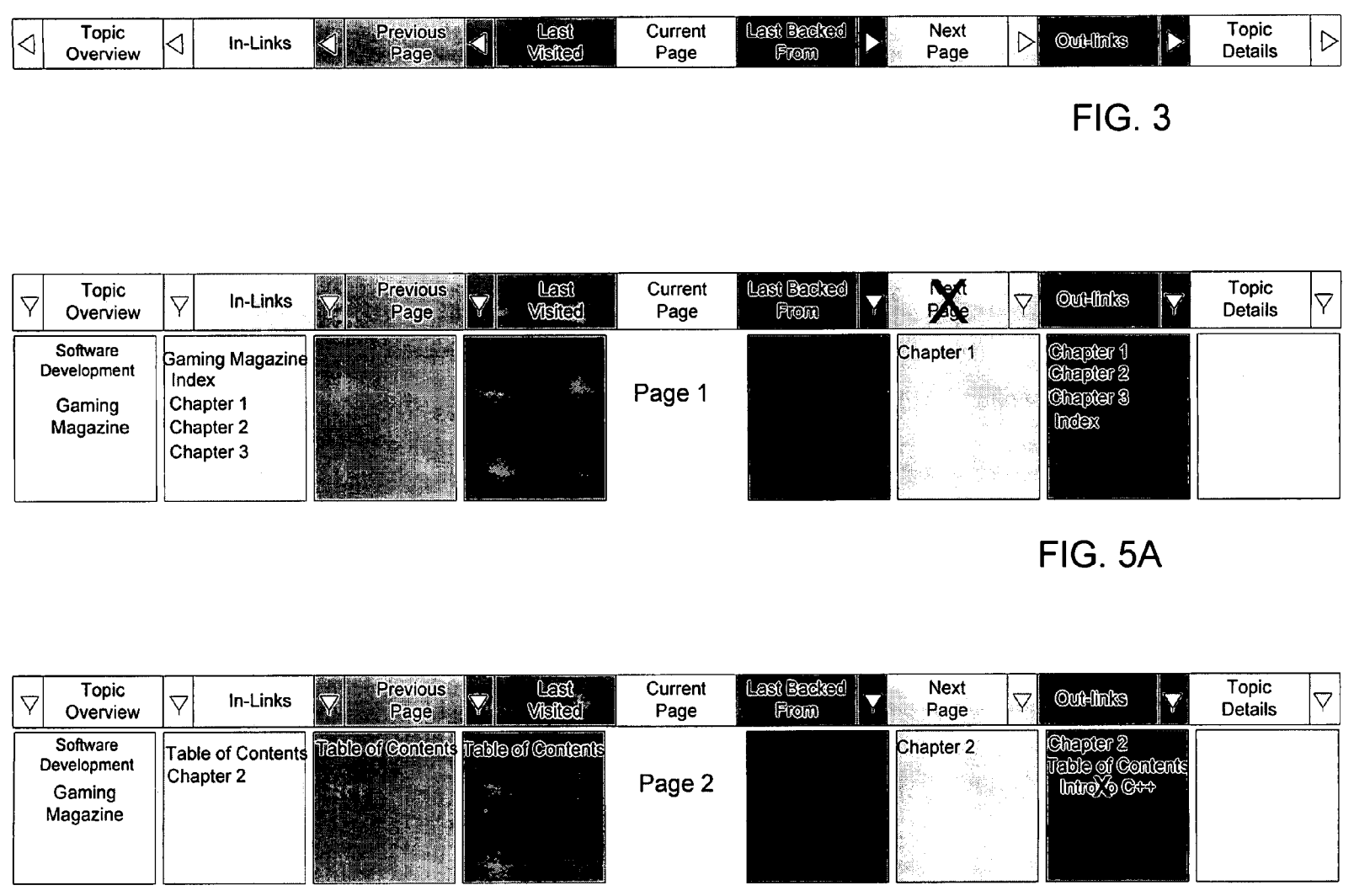
Figure 8:
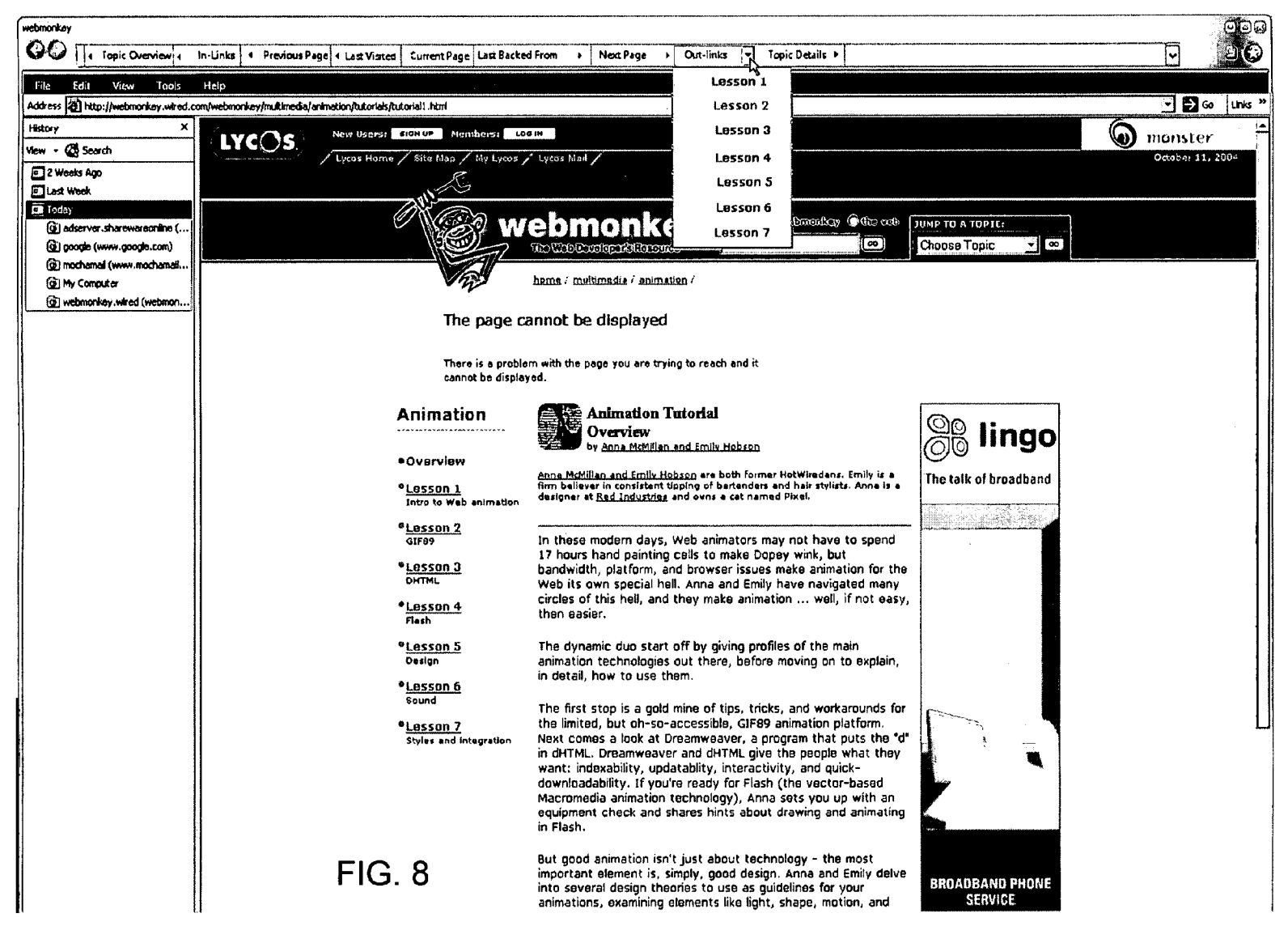

A standalone user interface component may be employed to implement the predictive travel log. For example, a navigational toolbar may be provided with a series of buttons representing different ranking categories such as shown in FIG. 3. In the illustrative navigational toolbar in FIG. 3, eight different ranking categories are shown as clickable buttons. The ranking categories include "Last Visited" and "Last Backed From" which respectively correspond to the conventional forward and back button navigation functionality, an "In-links" category and an "Out-links" category. Also, the ranking categories includes "Next Page" and "Previous Page" which correspond to out-link keywords, that contain directional words associated with forward and back navigation, respectively. In addition, the "Topic Overview" category corresponds to the results of a reverse query lookup associated with the current page to find pages that answer queries that return the current page. The "Topic Details" category corresponds to performing a search on content (e.g., a title or heading) within a page to identify related pages. FIG. 8 shows a navigational toolbar along with a web browser in a user interface example of the present invention.

One way to expose the navigational functionality from the navigational toolbar to the user would be to provide a drop down menu corresponding to a ranking category when the user clicks on the respective category button. Alternatively, the drop down menus may be presented to the user when the toolbar is called up by the user or automatically responsive to the user navigating to the currently viewed page. Many of the behaviors described above with respect to the traditional user interface equally apply to the navigation toolbar.

The items displayed in the travel log menu may be the actual URL's, or other information representing or identifying the link. In some implementations, more information about a particular item may be accessed such as by hovering over the item, or depressing an expansion region adjacent to the item.

Navigation Example

Figure 4:
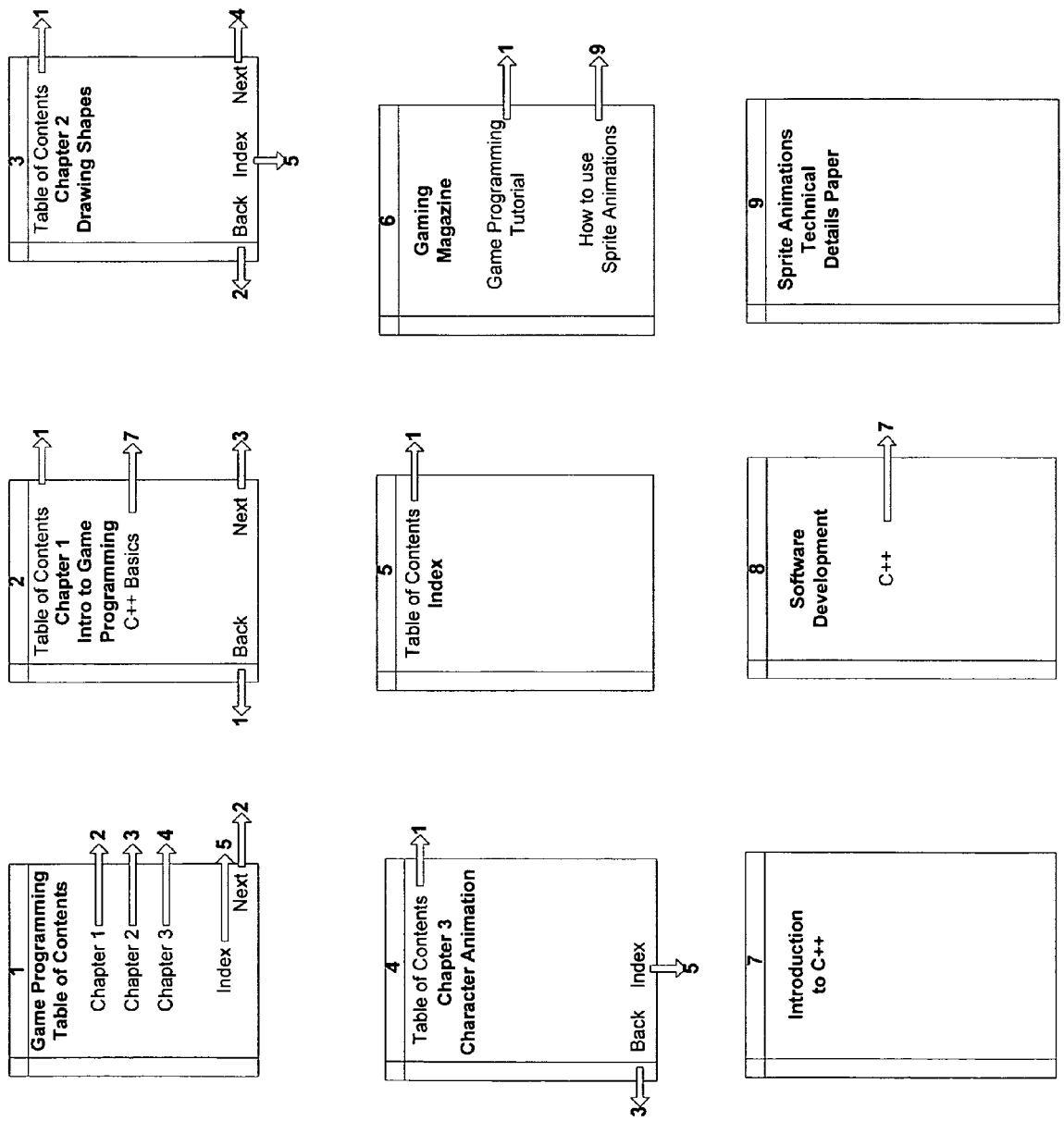
FIG. 4 shows a sub-web which is used to demonstrate an illustrative implementation of the present invention.
Figure 6A:
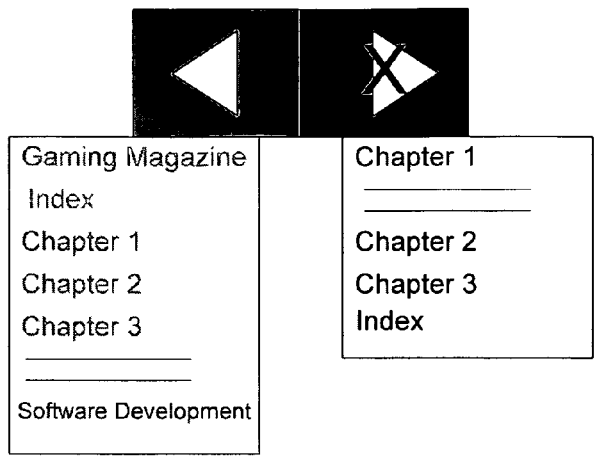

FIG. 4 shows a simplified sub-web of nine pages. This sub-web has only a few links and is being used for illustrative purposes only. One skilled in the art will appreciate that a real word scenario would offer a much larger variety of choices for the user. In this sub-web, each page has as a page number 1-9 at the top center of the page. Within the page are various hyperlinks associated with page content from which an arrow originates and points to a number representing an out-link, the page being linked to by the specific hyperlink. The next and back hyperlinks, if any on a page, corresponds, to the out-link keywords and will be found in the "Next Page" and "Previous Page" ranking category, respectively. In this sub-web: page 1 links to pages 2, 3, 4 and 5; page 2 links to pages 1, 3 and 7; page 3 links to pages 1, 2, 4 and 5; page 4 links to pages 1, 3 and 5; page 5 links to page 1; page 6 links to pages 1 and 9; page 8 links to page 7; pages 7 and 9 have no links. In the example of FIG. 4, pages 1-5 are from the same document, whereas pages 5-9 are each from other external documents.

FIGS. 5A-5G represent a navigational sequence and the state of the accompanying navigational toolbar user interface according to an illustrative embodiment of the present invention. FIGS. 6A-6G represent the same navigational sequence and the state of the accompanying user interface, where the user interface corresponds to a traditional travel log drop down menu associated with forward and back buttons, according to an illustrative embodiment of the present invention. As a contrast to the behavior of the inventive navigation system, the behavior of the traditional browser history navigation in Internet Explorer version 6.0 by Microsoft Corporation of Redmond, Wash. is shown in FIGS. 7A-7G.

Assume a user starts a browser application at page 1 of FIG. 4, the state of the toolbar user interface is shown in FIG. 5A. FIG. 5A shows that there are four out-links: Chapter 1 (page 2), Chapter 2 (page 3), Chapter 3 (page 4) and Index (page 5), one Next Page keyword out-link Chapter 2, four in-links: Gaming Magazine (page 6), Index, Chapter 1, Chapter 2 and Chapter 3, and two "Topic Overview" (e.g., reverse query search result) links Software Development (page 8) and Gaming Magazine. As represented by the "X" in FIG. 6A, the user navigates to the first link under the category "Next Page", by clicking on "Next Page". FIG. 5B represents the new state of the navigational toolbar user interface after the last navigation. The category dropdowns are populated based on the sub-web layout. The "Last Visited" category now includes the Table of Contents (page 1). The "Topic Overview" category includes the same results as when the user was on page 1. In one implementation, the "Topic Overview" category may be static as long as the user remains within the same document. Alternatively, the reverse search query can be performed on content associated with each new page.

Figures 5C, 5D, 5E:
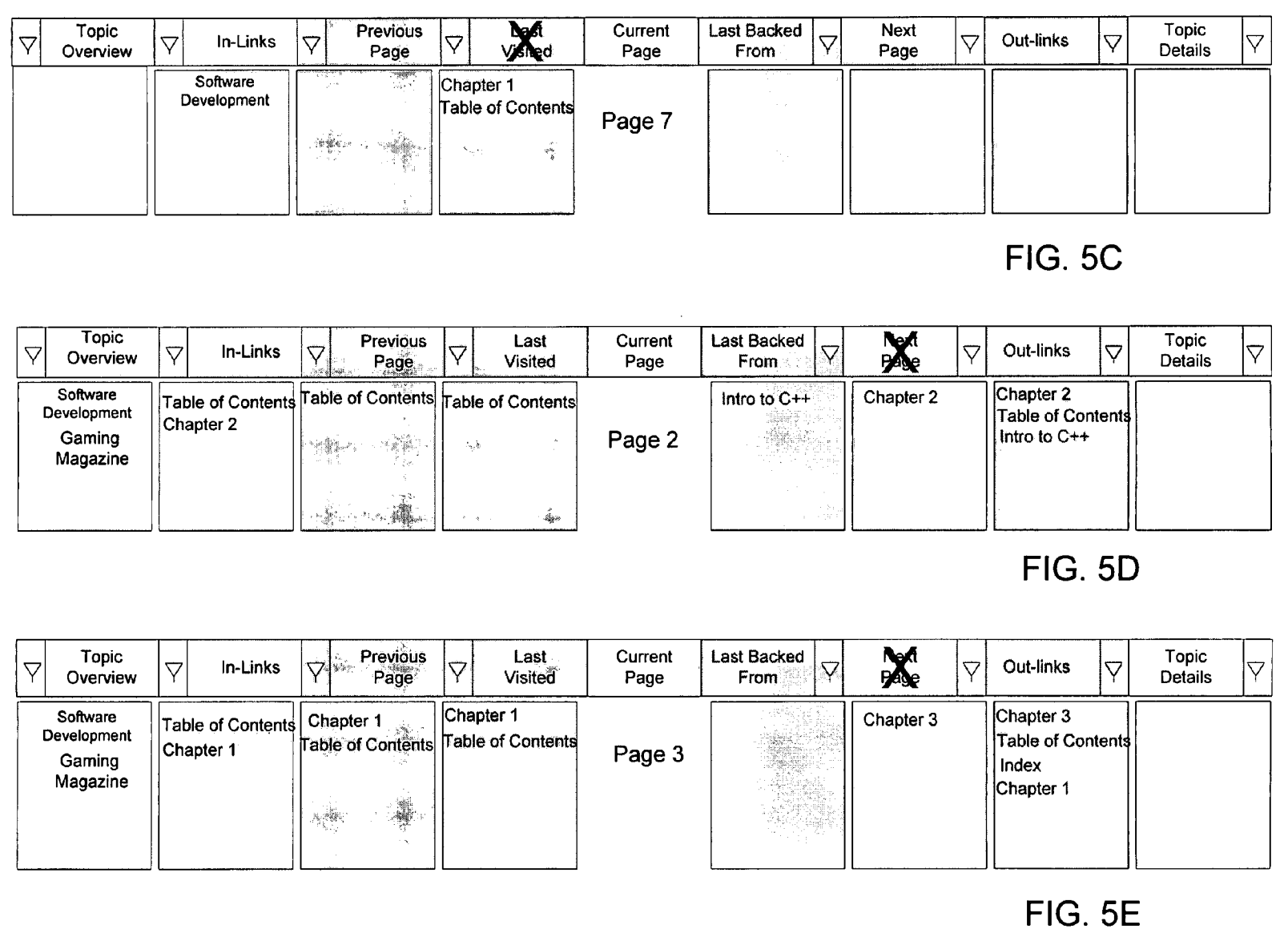

In the illustrative navigational sequence, the user clicks on the Intro to C++ out-link from the navigational toolbar to navigate to page 7. FIG. 5C shows the state of the toolbar following this navigation. As shown in FIG. 4, page 7 has no out-links. The toolbar in FIG. 5C shows the "Last Visited" list and one in-link. From page 7, the user clicks "Last Visited" to return to the highest ranked page listed in that category, Chapter 1 (page 2). FIG. 5D shows the state of the toolbar following this navigation. The navigational toolbar in FIG. 5D provides links in the categories "Topic Overview", "In-links", "Previous Page", "Last Visited", "Last Backed From" corresponding to the conventional forward button, "Next Link" and "Out-links".

Responsive to the user selecting the "Next Page" category, the system navigates to Chapter 2, page 3. The resulting state of the navigational toolbar is shown in FIG. 5E. From page 3, the user again selects the "Next Page" category causing the system to navigate to Chapter 3, page 4. The resulting state of the navigation toolbar is depicted FIG. 5F. Among other links on the navigational toolbar, a "Topic Details" link is identified. The "Topic Details" link resulted from a search being performed on the content Character Animation found on page 4. In this instance, a link to a page referred to as Sprite Animations related to Character Animation was returned.

Figures 5F, 5G:
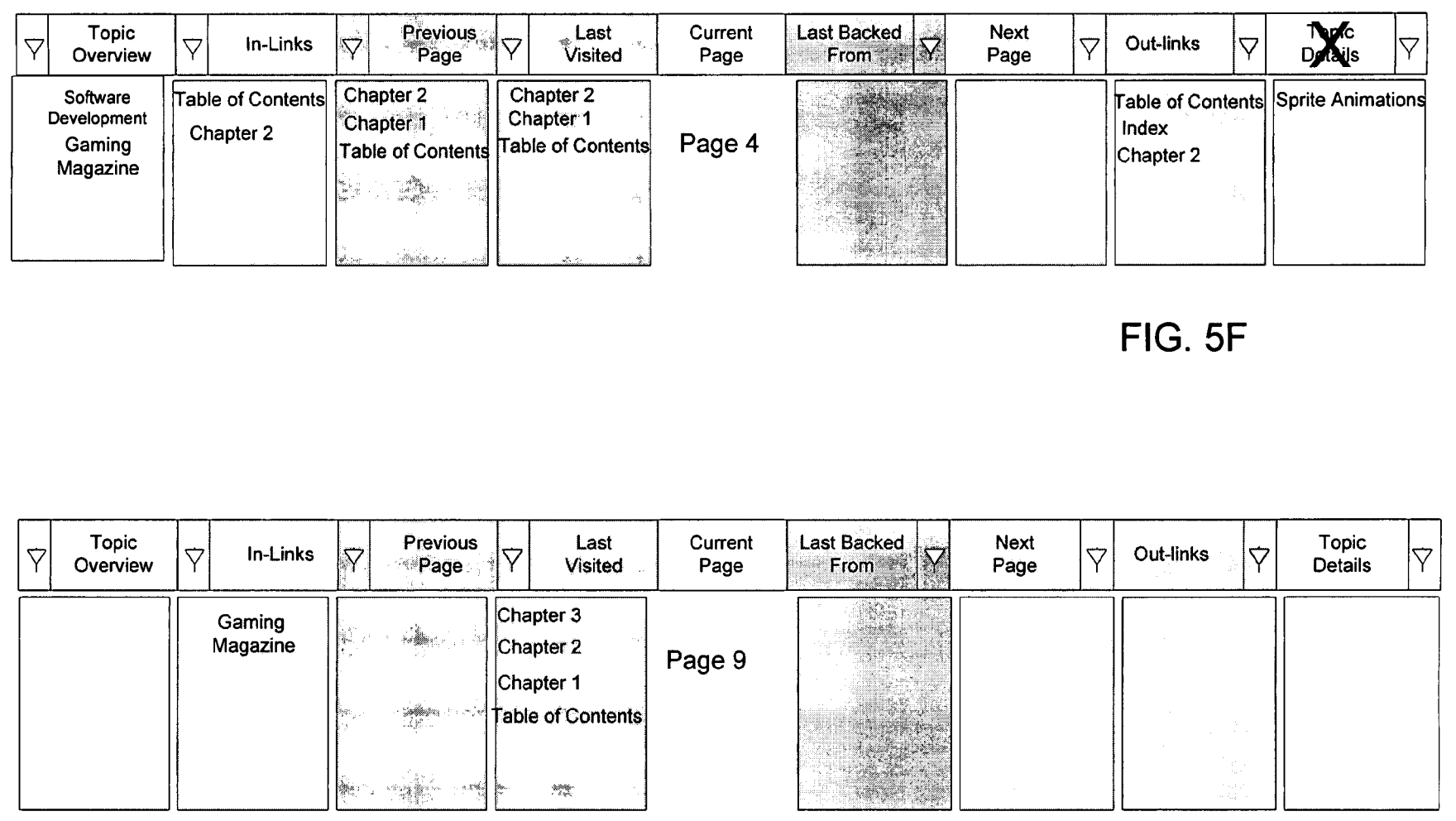

Responsive to the user selecting the "Topic Details" link, the system navigates to page 9, which is a paper on sprite animations. The resulting state of the navigational toolbar is shown in FIG. 5G with only "In-links" and "Last Visited" links available for this page.

FIGS. 6A-6G represent the states of user interface according to another embodiment of the invention using the same navigational sequence as described with respect to FIGS. 5A-5G. As such, a detailed explanation of the navigation scheme has been omitted as it is redundant. In FIGS. 6A-6G, the top most category in the travel-log menu drop downs will contain all members of its category and the categories below, in this example, do not separately list links which are identified in a higher category. For purposes of FIGS. 6A-6G, the back button category rankings from highest to lowest are as follows: "Last Visited", "Previous Page", "In-links" and "Topic Overview". For the forward button categories, they are ranked from highest to lowest as follows: "Last Backed From", "Next Page", "Out-links" and "Topic Details". In the example of FIGS. 6A-6G, the categories themselves are not identified. Thus, a user in navigating the same path as in FIGS. 5A-5G will explicitly have to click on the link unless the link is at the top of the travel log list in which case the user could select the corresponding forward or back button associated with the travel log list.

Figure 7A:
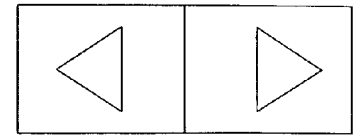
Figure 6B:
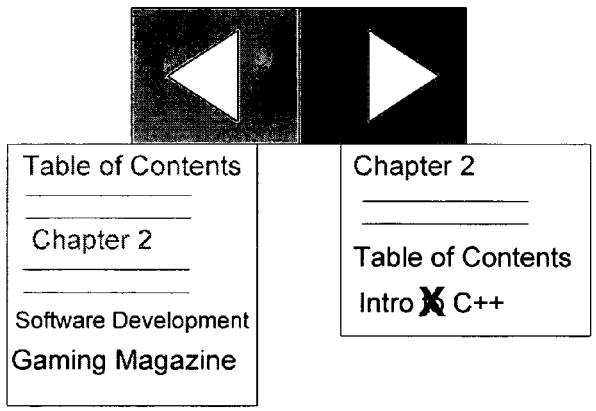
Figure 7B:
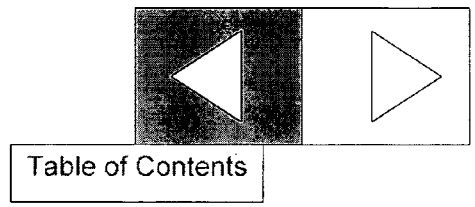
Figure 6C:
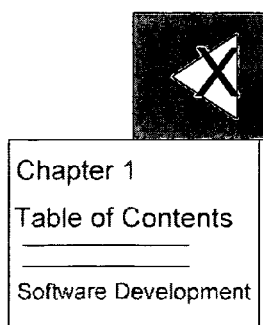
Figure 7C:
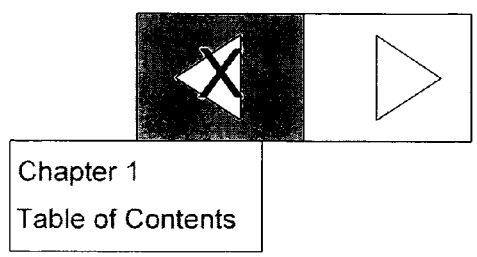
Figure 6G:
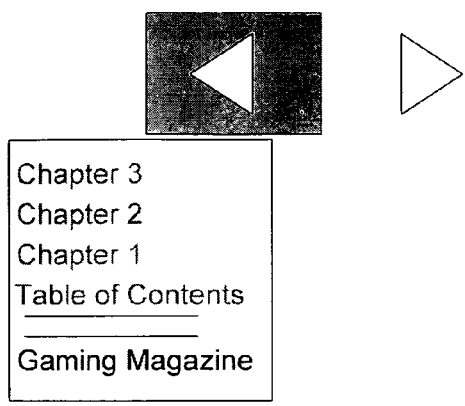

FIGS. 7A-7G show the state of the traditional back and forward buttons for performing the navigation sequence described with respect to FIGS. 5A-5G described above. FIG. 7A shows the state of the existing back\forward buttons. Both buttons are disabled and their dropdowns are disabled as well when the user starts browsing at page 1. The user cannot navigate to any page using the forward and background buttons. Instead, to navigate to page 2, the user must select the hyperlink Chapter 1 from the content of page 1. FIG. 7B shows the state of the existing back\forward buttons after navigating to page 2 using the hyperlink. The forward button remains disabled, while the back button is enabled such that the user could navigate back to page 1 using the back button. The user cannot use the forward and back buttons to navigate to any page other than page 1. To navigate to page 7, the user must select the hyperlink from the content of page 2. FIG. 7C shows the state of the existing back\forward buttons after the last navigation. Forward button is disabled. Back button is enabled and has a dropdown menu. To navigate to page 2 the user can press the back button.

FIG. 7C shows the state of the existing back\forward buttons after navigation to page 7 from page 2 using the hyperlink. In this state, the forward button remains disabled while the back button and has a dropdown menu. To navigate to page 2, the user can press the back button. FIG. 7D shows the state of the existing back\forward buttons after navigating to page 2 from page 7 by pressing the back button. In this state, both the back and forward buttons are enabled. Nonetheless, the user cannot navigate to page 3 using the forward or back button or by selecting a link from their associated drop downs. Instead, to navigate to page 3, the user has to select the hyperlink from within the current page, page 2. FIG. 7E shows the state after the user navigates to page 3 from page 2 by selecting the hyperlink. In this case, only the back button is enabled. Thus, the user cannot navigate to page 4 using the forward or backward buttons; rather the user must select the appropriate hyperlink from within the content of the current page.

Figure 7G:
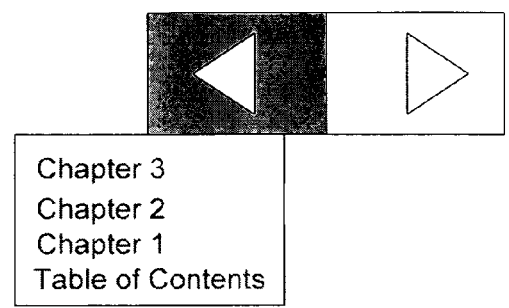

FIG. 7F shows the state after navigating from page 3 to page 4 by selecting the hyperlink. In this state, the back button is enabled with the back button dropdown menu. The user cannot navigate to page 9 from page 4 without knowing address of page 9. Thus, to navigate to page 9, the user must enter the URL for page 9. FIG. 7G shows the state of the back\forward buttons including the content of their dropdowns when the user navigates to page 9 after entering the web address in her browser. In this state, only the back button and its dropdown menu are enabled.

Implementation Details

In one implementation a library, such as a .NET library can be used to obtain network topography information. The library can use search functionality (e.g., MSN search functionality) to provide in-link information for web pages as well as ranking information. A system may be built on top of the browser application. An interface module can plug into the browser and act as a proxy on the function call by the browser's user interface to the library that updates the travel log. The interface module then fills the travel log with predictive navigational alternatives and determines the rank order of the navigational alternatives. The function calls for Microsoft Internet Explorer, an illustrative browser operable with present invention, are publicly available and can be found at, among other places, http://msdn.microsoft.com/workshop/browser/travellog/travellog.asp. In one embodiment of the invention, the interface module which implements the predictive navigation functionality within the browser is located between the browser and the library. It should be understood that the interface module can include a series of modules with independent functionality.

The interface module receives the URL of the current page from the browser and provides the URL to a function call to the library which returns a structure including in-links for the current page. The structure can also include information such as the actual page content of the in-link. The library serves to fetch and cache the external information. Thus, when in-links or ranking scores are needed, the library can be accessed to fetch and cache this information. In this example, the library is a local library.

The interface module can be a standalone application hosted by the browser which obtains all external information through function calls to modules in the library. The application can be a plug-in to the browser. In alternative implementation, the code for the forward and back button functionality in the browser could be modified to perform the information gathering function by initiating the necessary searches.

CONCLUSION

While illustrative systems and methods as described herein embodying various aspects of the present invention are shown by way of example, it will be understood, of course, that the invention is not limited to these embodiments. Modifications may be made by those skilled in the art, particularly in light of the foregoing teachings. For example, each of the elements of the aforementioned embodiments may be utilized alone or in combination with elements of the other embodiments. Also, the invention has been defined using the appended claims; however these claims are exemplary in that the invention is intended to include the elements and steps described herein in any combination or sub-combination. It will also be appreciated and understood that modifications may be made without departing from the true spirit and scope of the invention.

We claim:

1. A method for providing navigational alternatives to a user viewing a web page comprising:
    accessing the web page, wherein the accessed web page is displayed via a web browser user interface;
    causing a search engine to run a search, transparent to the user, the search identifying out-links on the web page and identifying in-links on additional web pages that are configured to link to the web page;
    determining whether one or more of the out-links is a same site out-link or an out-link that links to another site and determining whether one or more of the in-links is a same site in-link or an in-link from another site by parsing the address of the web page;
    ranking same site out-links ahead of out-links that link to other sites and ranking same site in-links ahead of in-links from other sites;
    causing items representing the out-links to be displayed in ranked order in response to a user clicking a button in a web browser user interface associated with forward functionality; and
    causing items representing the in-links to be displayed in ranked order in response to a user clicking an additional button in the web browser user interface associated with backward functionality, wherein the items representing the in-links include at least one item representing a same site in-link and at least one item representing an in-link from another site.

2. The method according to claim 1, further comprising:
    determining that at least one same site out-link contains a keyword; and
    ranking the at least one same-site out-link containing the keyword higher than at least one same site out-link that does not contain the keyword.

3. The method according to claim 1, further comprising:
    determining that at least one same site out-link is a higher level out-link; and
    ranking the at least one higher level same site out-link higher than at least one same site out-link which is not a higher level out-link.

4. The method according to claim 3, further comprising comparing the address of the at least one same site out-link to the address of the web page to determine whether a same site out-link is a higher level out-link.

5. The method according to claim 4, wherein said comparing comprises applying fuzzy prefix logic.

6. A computer-readable storage medium having computer-executable instructions for performing the steps recited in claim 1.

7. The method of claim 1, further comprising
    retrieving a plurality of predictive navigational alternatives for the web page;
    displaying separate indicia for each of a plurality of ranking categories so that the user can select one of the ranking categories in order to access a list of predictive navigational alternatives, each ranking category having its own list of predictive navigational alternatives.

8. A method for providing navigational alternatives to a user viewing a web page comprising:
    accessing the web page, wherein the accessed web page is displayed via a web browser user interface;
    causing a search engine to run a search, transparent to the user, the search identifying out-links on the web page and identifying in-links on additional web pages that are configured to link to the web page;
    ranking the out-links based on criteria associated with the content of each out-link page, wherein same site out-links are ranked ahead of out-links that link to other sites; and
    causing items representing the out-links to be displayed in a listed ranked order responsive to clicking a forward button associated with the web browser user interface; and
    causing items representing the in-links to be displayed in a listed ranked order responsive to clicking a back button associated with the web browser user interface, wherein the items representing the in-links include at least one item representing a same site in-link and at least one item representing an in-link from another site, wherein same site in-links are displayed in the listed ranked order ahead of in-links from other sites.

9. The method according to claim 8, wherein the criteria includes the number of in-links to each out-link page.

10. A computer-readable storage medium having computer-executable instructions for performing the steps recited in claim 8.

11. A method for providing navigational alternatives to a user viewing a web page comprising:
    accessing the web page, wherein the accessed web page is displayed via a web browser user interface;
    causing a search engine to run a search, transparent to the user, the search identifying out-links on the web page and in-links for the web page;
    ranking the out-links and the in-links, wherein same site out-links are ranked ahead of out-links that link to other sites and same site in-links are ranked ahead of in-links from other sites;
    causing items representing the out-links to be displayed in a listed ranked order while displaying the web page responsive to clicking a forward button associated with the web browser user interface; and
    causing items representing the in-links to be displayed in a listed ranked order while displaying the web page responsive to clicking a back button associated with the web browser user interface, wherein the items representing the in-links include at least one item representing a same site in-link and at least one item representing an in-link from another site.

12. The method according to claim 11, wherein the listed ranked order of in-links includes receiving the in-links from a search engine.

13. The method according to claim 12, further comprising:
    determining that at least one same site out-link contains a keyword; and
    ranking the at least one same-site out-link containing the keyword higher than at least one same site out-link that does not contain the keyword.

14. The method according to claim 11, wherein the listed ranked order of the in-links includes ranking same site in-links higher than in-links from another site.

15. The method according to claim 11, further comprising:
    determining that at least one same site out-link is a higher level out-link; and ranking the at least one higher level same site out-link higher than at least one same site out-link which is not a higher level out-link.

16. The method according to claim 15, further comprising comparing the address of the at least one same site in-link to the address of the web page to determine whether a same site in-link is a higher level in-link.

17. The method according to claim 15, wherein said comparing comprises applying fuzzy prefix logic.

18. A computer-readable storage medium having computer-executable instructions for performing the steps recited in claim 11.

19. A method for providing navigational alternatives to a user viewing a web page comprising:
  accessing and displaying the web page via a web browser user interface;
  causing a search engine to run a search, transparent to the user, the search identifying out-links and in-links for the web page;
  ranking the out-links and in-links based on behavior of other users, wherein same site out-links are ranked ahead of out-links that link to other sites and same site in-links are ranked ahead of in-links from other sites;
  displaying items representing the out-links in a listed ranked order responsive to clicking a forward button associated with the web browser user interface; and
  displaying items representing the in-links in a listed ranked order responsive to clicking a back button associated with the web browser user interface, wherein the items representing the in-links include at least one item representing a same site in-link and at least one item representing an in-link from another site.

20. The method according to claim 19, where the behavior of other users includes a number of times other web pages have been navigated to from the web page.

21. The method according to claim 19, wherein ranking further comprises ranking pages that are returned along with the web page responsive to search engine queries.

22. The method of claim 19, wherein the search engine searches for the identified links based on a ranking category according to the content of the currently viewed page, the content of the currently viewed page selected from a group, the group comprising:
  title;
  major content of the page; and
  content proximate to the current cursor location.

23. An apparatus comprising:
  a storage memory; and
  a processor,
  wherein the processor is configured to execute instructions stored on the storage memory, and wherein the processor, when executing the instructions in response to a web page being displayed via a web browser user interface, causes the apparatus to provide a navigational toolbar for providing navigational alternatives in a listed ranked order during browsing responsive to clicking a back button or a forward button associated with the web browser user interface, the navigational toolbar including:
    a first selectable region identifying in-links present in a currently viewed web page, wherein the first selectable region is configured to display items representing the in-links in ranked order responsive to clicking the back button, wherein the items representing the in-links include at least one item representing a same site in-link and at least one item representing an in-link from another site, wherein same site in-links are displayed in the ranked order ahead of in-links from other sites; and
    a second selectable region identifying out-links present in the currently viewed web page, wherein the second selectable region is configured to display items representing the out-links in ranked order responsive to clicking the forward button, and wherein the in-links and out-links are identified by a search, the search being run transparent to a user, wherein same site out-links are displayed in the ranked order ahead of out-links that link to other sites.

24. The apparatus of claim 23, wherein the listed ranked order includes ranking same site in-links higher than in-links from another site.

* * * * *